Nov. 30, 1943.   M. J. BINKS   2,335,257
MOVEMENT GENERATING MECHANISM
Original Filed March 15, 1940   3 Sheets-Sheet 1
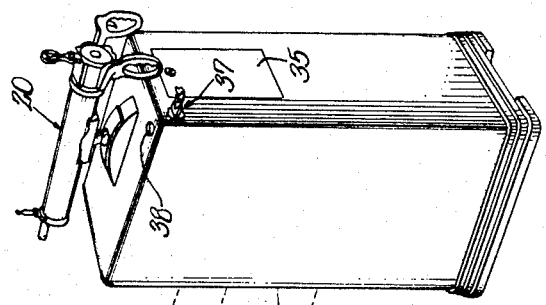
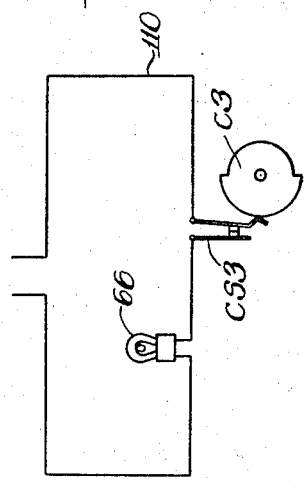
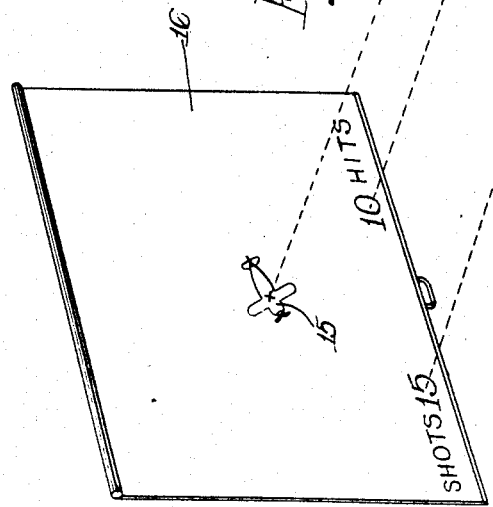
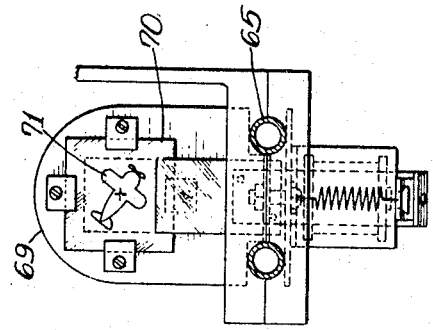
INVENTOR.
Melvin J. Binks,
BY Ernest A. Wegner
his ATTORNEY.

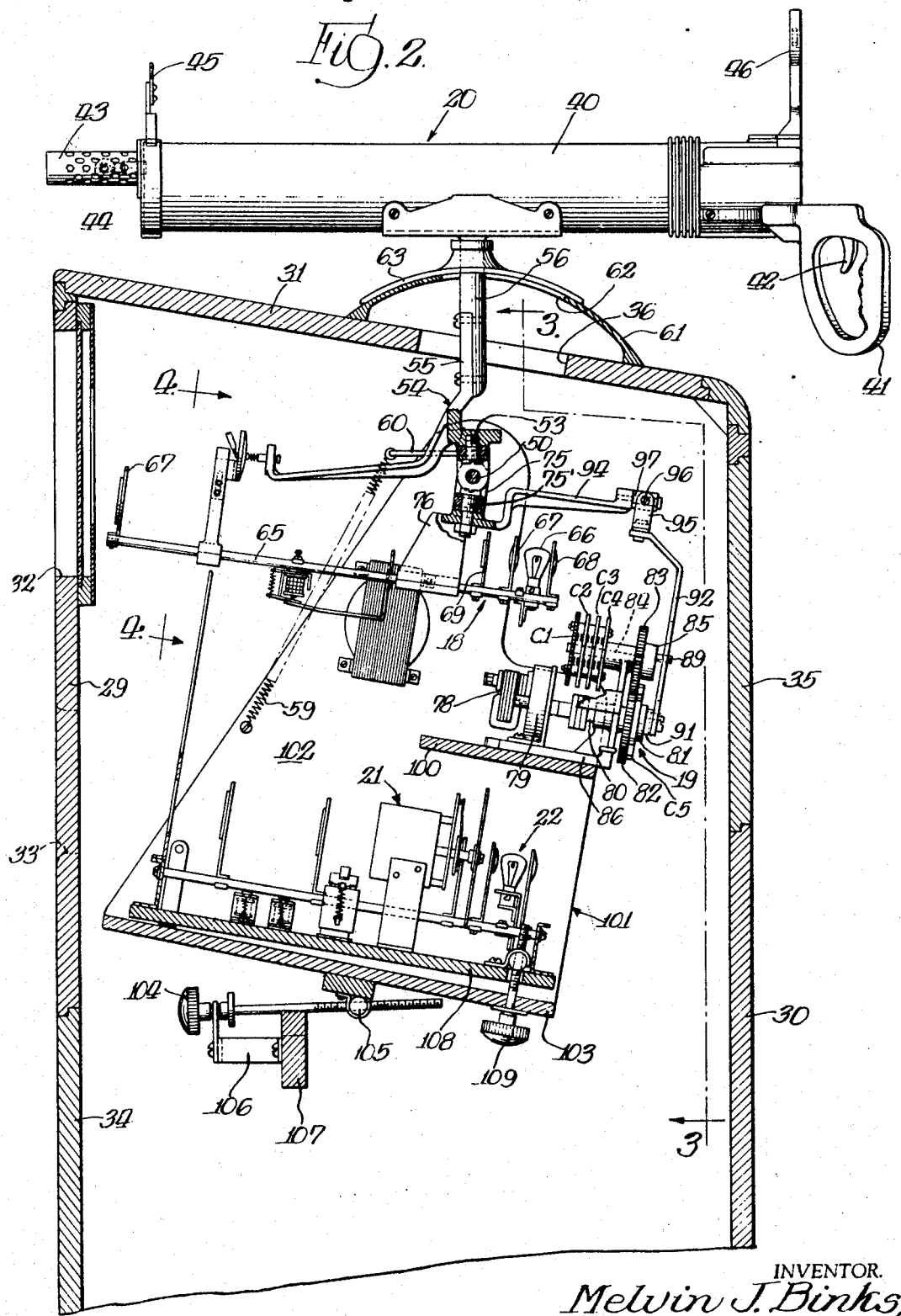

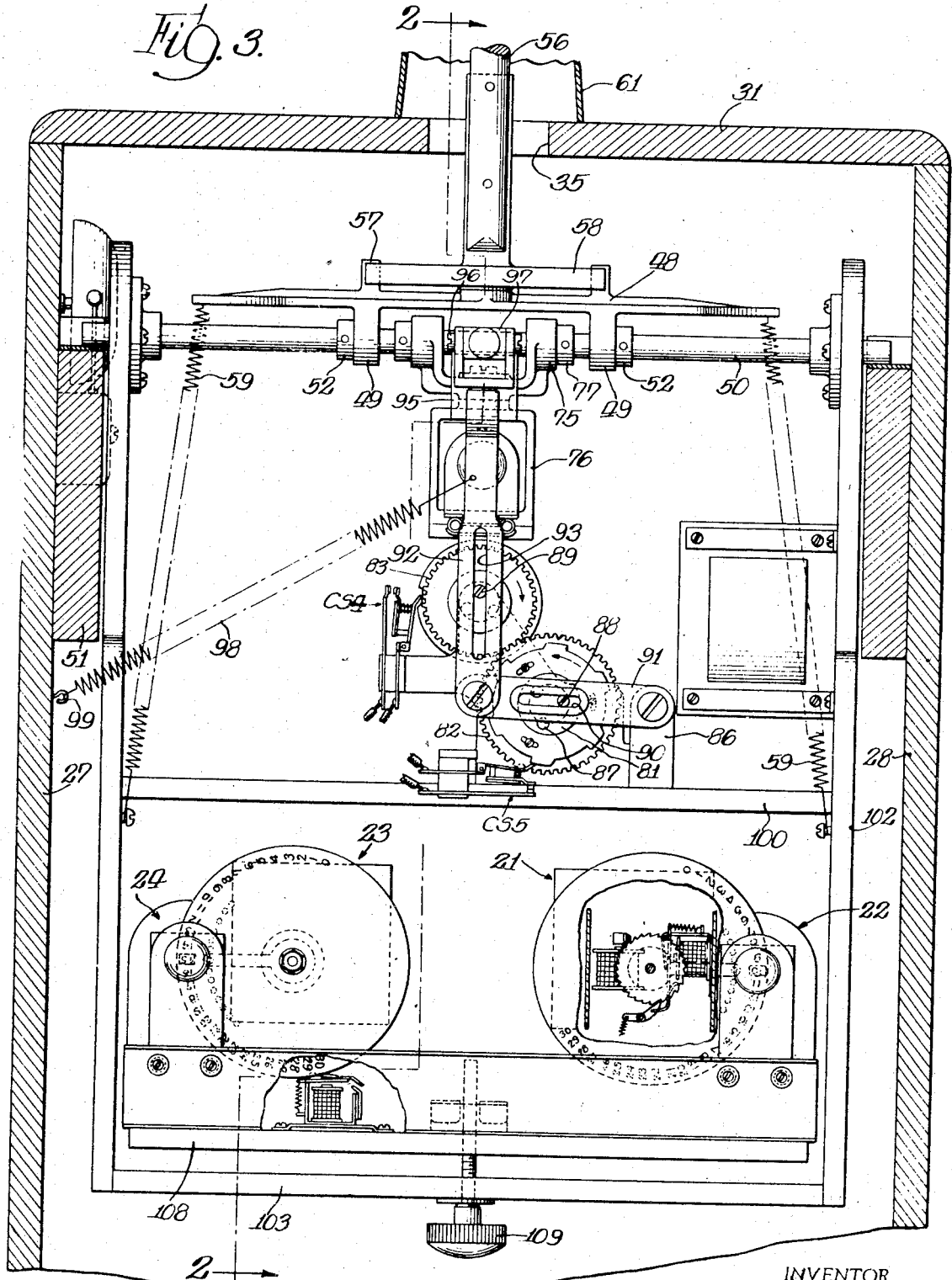

Patented Nov. 30, 1943

2,335,257

UNITED STATES PATENT OFFICE 2,335,257

MOVEMENT GENERATING MECHANISM

Melvin J. Binks, River Forest, Ill., assignor to J. H. Keeney & Co., Inc., Chicago, Ill., a corporation of Illinois Original application March 15, 1940, Serial No. 324,064. Divided and this application September 9, 1940, Serial No. 355,948

18 Claims. (Cl. 273—105.1)

The invention relates generally to mechanism for generating movement such as by projecting an image onto a screen, and more particularly to mechanism for projecting an image in a manner causing the same successively to traverse the screen.

One object of the invention is to provide a movement generating mechanism operable to cause an object or the image thereof cast onto a screen successively to traverse the screen in a variety of irregular paths with each successive path differing from the previous path.

Another object is to provide a movement generating mechanism operable to cause an object or the image thereof cast onto a screen successively to traverse the screen in a variety of irregular paths and having adjustable means for varying the extent of horizontal or vertical movement of the object or its image.

A further object is to provide a projecting mechanism having a projector mounted for universal movement and driving means for the projector operable to cause the image projected onto the screen repeatedly to traverse the screen, but varying with each traverse to modify the path of movement of the image.

Still a further object is to provide a projecting mechanism having a projector mounted for universal movement, an object whose image is to be projected fixedly mounted on the projector, and driving means for the projector operable to oscillate the projector through successively differing cycles.

Other objects and advantages will become apparent from the following detailed description taken in connection with the accompanying drawings, in which:

Fig. 1 is a perspective view of a skill testing game embodying the features of this invention.

Fig. 2 is an enlarged vertical sectional view of the casing shown in Fig. 1, taken approximately in a plane to the left of the aiming element as viewed in that figure, more particularly approximately along line 2—2 of Fig. 3.

Fig. 3 is a vertical sectional view taken approximately along the line 3—3 of Fig. 2 and with some parts broken away.

Fig. 4 is an enlarged fragmentary detail view taken approximately along the line 4—4 of Fig. 2.

Fig. 5 is a diagrammatic view of the electrical circuit for the projector lamp.

While the invention is susceptible of various modifications and alternative constructions, it is here shown and will hereinafter be described in a preferred embodiment. It is not intended, however, that the invention is to be limited thereby to the specific construction disclosed, but on the contrary it is intended to cover all modifications and alternative constructions falling within the spirit and scope of the invention as defined in the appended claims.

This application is a division of my copending application for Skill testing game, Serial No. 324,064, filed March 15, 1940.

Though the invention has a variety of uses and adaptations, it is especially and particularly well adapted for the production of a target in a skill testing game. Accordingly, it will herein be disclosed in that environment though it is not intended that the invention is to be limited to that use.

A game of the character mentioned comprises generally a movable target 15, simulating an aeroplane, which might be a material object but herein is not a material object but the projection of an object onto a screen 16, suitably supported from a wall or standard (not shown), whereby the target is clearly visible to others than the operator of the game. Spaced from the screen 16, to form an operator's station, is a casing 17 which houses or supports all of the operating mechanism of the game, there being no connection whatsoever between the casing and the screen or target. Included in the operating mechanism and constituting the invention to which this application is directed is a target projecting means 18, housed within the casing and given a unique mounting, and driving mechanism 19 for causing the target to traverse the screen in a succession of different paths. Movably supported above the casing 17 for manipulation by an operator of the game is an aiming element 20 which is to be aimed at the target and, if properly aimed and actuated, cooperates with means within the casing to indicate the scoring of a hit. In the present instance, the scoring of a hit is indicated to the operator as well as onlookers by flashing the target red and by projecting onto the screen the total number of hits scored. For the latter purpose, the mechanism includes a hits scored counter 21 and a hit projector 22. Likewise the mechanism includes a shots fired counter 23 and a shots fired projector 24.

Turning now to a more detailed consideration of the various units of the game, the casing 17 is upstanding to support the aiming element 20 at a height convenient for sighting and manipulation by the average person. The casing is composed of solid side walls 27 and 28, a front wall 29, a rear wall 30, and a top wall 31. The front wall 29 is apertured at its top center to provide a window 32 for the projection therethrough of the target 15, and with a pair of windows 33 at either side for the projection therethrough of the shots fired and hits scored. Beneath the windows 33 the front wall is formed with a removable panel 34 through which access is had to the interior of the casing for the purpose of adjusting the positions of the various projectors. The rear wall 30 is preferably formed with a removable panel 35 through which access may be had to the interior of the casing, and the top wall is formed with an elongated slot 36 through which the support for the aiming element 20 projects, as will presently be described in greater detail. Mounted in the upper left hand corner of the rear wall 30 is a conventional coin actuated mechanism 37, and formed in the corner of the top wall 33 above the mechanism 37 is an observation window 38. The aiming element 20 herein simulates a machine gun and to that end is formed with a cylindrical barrel 40 having at one end a pair of hand grips 41 to aid the operator in the manipulation of the gun, the right hand one of which hand grips is provided with a trigger 42. At the other end, the gun is provided with a perforated muzzle 43 within which is concealed a light bulb 44 which is connected to flash intermittently when the trigger 42 is pulled so as to give the effect of the firing of an actual machine gun. Conventional sights 45 and 46 are, of course, provided to enable the operator of the game properly to aim the gun at the target.

To give the aiming element 20 the freedom of movement necessary to permit the operator to follow the target across the screen, a universal mounting for the aiming element is provided. Such universal mounting herein comprises a yoke-like member 48, the ears 49 of which are loosely pivoted upon a horizontal shaft 50 extending transversely of the casing 17 and journaled at its ends in blocks 51 secured to the side walls 27 and 28 of the casing. Collars 52 are pinned on the shaft 50 to retain the member 48 against movement longitudinally of the shaft. Secured centrally of the member 48, as by means of a pin 53, to turn about an axis at right angles to the horizontal shaft 50, is a bracket 54 having an upstanding arm 55 projecting through the slot 36 in the top wall of the casing and secured to a supporting rod 56 extending downwardly from the aiming element 20. To limit the arc through which the gun may be swung about the pin 53, the yoke-like member 48 is provided with upstanding lugs 57 and the bracket 54 is formed with a T-bar 58 the opposite ends of which are adapted to engage one of the lugs 57 to prevent further swinging in that direction. To counterbalance the rear or trigger end of the aiming element, tension springs 59 are provided which are anchored at one end to a stationary part and at the other end to a forwardly projecting finger 60 on the yoke-like member 48.

In order that the slot 36 may permit of the necessary movement of the rod 56 without being unduly long, the horizontal shaft 50 is mounted closely adjacent the top of the casing 17. Moreover, to provide a closure for the slot 36, an arcuate hood 61 is mounted thereover which has an elongated slot 62 through which the rod 56 projects. This slot 62 is in turn at all times covered by an arcuate shoe 63 which is carried on the rod 56 and slides on the hood 61 as the aiming element is tilted.

The target projector 18 is of generally conventional construction and comprises an elongated frame 65 upon which are mounted a light 66, suitable lenses 67 and a reflector 68. Also carried by the frame 65 (see Figs. 2 and 4) is an apertured plate 69 upon which is mounted a film element 70 bearing the real object 71, the image or projection of which is cast upon the screen 16 to form the target 15. The apertured plate 69, while adjustable longitudinally of the frame 65, once adjusted is fixed relative to the projector.

Herein the target is given a unique movement in which the target in its successive traverses of the aiming range of the aiming element 20 travels in different paths in order to enhance the simulation of actual aeroplane movement, as well as to render more difficult and more fascinating the operation of the game. To that end, the projector 18 is given a unique mounting and is also driven in a unique manner. The unique mounting for the projector renders the same universally movable and comprises a first yoke-like member 76 journaled on the horizontal shaft 50, and a second yoke-like member 76 which carries the frame 65 and is suspended by pin 75' from the bottom of the member 75 to turn about an axis at right angles to the horizontal shaft 50. The yoke 75 is restrained against movement longitudinally of the shaft 50 by collars 77 pinned thereto and, moreover, is so positioned that the axis about which the yoke 76 turns lies in the same transverse vertical plane as the axis about which the bracket 54 turns. The desirability of having the aiming element 20 and the projector 18 pivot about the same horizontal axis and turn about right angular axes lying in the same transverse vertical plane will presently become more apparent.

As previously stated, the projector 18 is given a unique movement causing the target 15 to travel through a different path in each successive traverse of the screen 16. Such unique movement is imparted to the projector 18 by the driving means 19 which herein comprises an electric motor 78, which through suitable reduction gearing 79 drives a shaft 80 which has at its outer end an enlarged head 81. Secured to rotate with the shaft 80 is a gear 82 meshing with a similar but just slightly smaller gear 83 fixed on a shaft 84 which also has an enlarged head 85. While the number of teeth in the gears 82 and 83 may be varied at will, by way of example, the gears 82 and 83 here shown have sixty-one and fifty-nine teeth respectively. A suitable frame 86 provides a support for the motor, the reduction gearing 79 and bearing in which the shafts 80 and 84 are rotatably journaled.

The shaft head 81, as best seen in Fig. 3, is provided with a plurality of (in this instance three) tapped holes 87 spaced at various radii from the axis of the shaft 80 and which are adapted to receive a projecting pin 88. The shaft head 85 is likewise formed with three tapped holes spaced various radial distances from the axis of the shaft 84 in which a projecting pin 89 may be received. The pin 88 operates in an elongated longitudinal slot 90 of a link 91 which is stationarily pivoted at one end to the frame 86. At its free end the link 91 is pivoted to one end of a similar link 92, which likewise is formed with a longitudinal slot 93 in which the pin 89 operates. The upper or remaining end of the link 92 is connected to a rearwardly extending arm 94 integral with the yoke member 76 and hence with the projector 18. In order to permit of the limited relative movement which will take place between the link 92 and the arm 94 in the actuation of the projector 18, the link 92 has swiveled at its upper end a yoke 95 which carries a pin 96 engaging a slot 97 in the end of the arm 94. Gear 82 is driven in a counter-clockwise direction, while gear 83 necessarily is driven in a clockwise direction with the result that the target 15 traverses the screen during the time that the arm 94 of the projector 18 is being propelled to the right, as viewed in Fig. 3. To take up any play or wear in the driving mechanism, so as to have a smooth movement of the target across the screen, a tension spring 98 is connected at one end to the link 92 above the slot 93 therein and at the other end to a stationary eyelet 99 to the left of the link, as viewed in Fig. 3.

It is believed readily apparent from the foregoing that, inasmuch as the pins 88 and 89 are eccentrically mounted, rotation of the shafts 80 and 84 will cause a pivoting of the link 91 about its fixed pivot and thus impart pivotal movement of the projector 18 about the shaft 50, while the link 92 will pivot about its connection to the link 91 and impart turning movement of the projector about its right angular axis. It is believed also apparent that with each revolution of the shaft 84 the target will be caused to traverse the screen 16 and to be returned to initial position. Inasmuch as the gears 82 and 83 are of different size and, more particularly, because they vary by only a few teeth, the gears are constantly out of timed relation so that the movement imparted to the projector 18 is constantly being varied resulting in each successive traverse of the screen by the target 15 being over a different path. By providing a plurality of tapped holes 87, the path of movement of the target 15 may be further varied and the extent of vertical or horizontal travel of the target may also be adjusted to adapt the game for different shapes or sizes of screen, or for different spacing of the casing 17 from the screen.

The frame 86 supporting the driving mechanism for the projector 18 is in turn supported upon a shelf 100 forming part of a frame 101 swingably suspended from the horizontal shaft 50. In addition to the shelf 100, the frame 101 comprises a pair of side boards 102 pivotally supported from the horizontal shaft 50, and a main connecting board or shelf 103. The frame 101 is adjustably secured in a desired position for proper focusing of the projector 18 on the screen 16 by means of an adjusting screw 104 threadedly received in a nut 105 secured beneath the shelf 103, and rotatably guided but held against axial movement in a bracket 106 secured to a cross brace 107 of the casing. The adjusting screw 104 is accessible through the opening in the front wall 29 normally closed by the removable panel 34.

Supported on the shelf 103 to be movable therewith is a base 108 upon which are mounted the hits scored counter 21, the hits scored projector 22, the shots fired counter 23, and the shots fired projector 24, as well as certain other units. The base 108 is hinged to the shelf 103 at its forward edge and may be swung about such hinged connection by means of an adjusting screw 109 disposed at the rear of the base 108.

It is desirable, particularly when the projecting mechanism is employed to create a target, that the target appear to have a forward movement only. To that end the lamp 66 of the projector is arranged to be deenergized during the return movement of the projector. Accordingly the lamp 66 is connected in an electrical circuit 110 in series with a cam switch CS3, which is one of a plurality of switches CS1 to CS5, controlled by a cam C3. The cam C3 is in turn one of a series of cams C1 to C5 respectively controlling the switches CS1 to CS5, all as more particularly disclosed and claimed in my above mentioned copending application Serial No. 324,064, filed March 15, 1940.

The cam C3 is fixed to rotate with the shaft 84 and thus make one complete revolution for each cycle of swinging of the projector about its vertical axis. The cam C3 is so shaped as to close the switch CS3 during one half revolution and to open the same during the other half and, of course, is given such angular adjustment relative to the shaft 84 as to cause the lamp 66 to be energized during the forward swing of the projector and to be deenergized during the return swing. Thus the image will not be cast on the screen during the return swing and thus will not appear to be traveling backwardly.

I claim as my invention:

1. Projecting mechanism comprising, in combination, a projector for throwing an image onto a screen, a universal mounting for said projector, and means for driving said projector to cause the image successively to traverse the screen in different paths, said means comprising a first link pivotally secured at one end, a second link pivotally secured at one end to the free end of said first link and at its other end secured to said projector, a longitudinal slot in each of said links, a motor, a first gear driven by said motor and a second gear driven by said first gear, and having a different number of teeth than said first gear, each of said gears having rotatable therewith an eccentrically mounted pin engaging in the slot in one of said links, at least one of said eccentrically mounted pins being adjustable radially to vary the throw imparted to said projector.

2. Projecting mechanism comprising, in combination, a projector for throwing an image onto a screen, a universal mounting for said projector, and means for driving said projector to cause the image successively to traverse the screen, said means comprising a first link pivotally secured at one end, a second link pivotally secured at one end to the free end of said first link and at its other end pivotally secured to said projector, a longitudinal slot in each of said links, a motor, a first gear driven by said motor, a second gear driven by said first gear, and an eccentrically mounted pin rotatable with each of said gears and engaging in the slot in one of said links.

3. In a skill testing game, a projector for throwing onto a screen an image forming the target of the game, a universal mounting for said projector, and means for driving said projector to cause the target successively to traverse the screen in different paths, said means comprising a first link pivotally secured at one end, a second link pivotally secured at one end to the free end of said first link and at its other end secured to said projector, a longitudinal slot in each of said links, a motor, a first gear driven by said motor and a second gear driven by said first gear, each of said gears having rotatable therewith an eccentrically mounted pin engaging in the slot in one of said links, at least one of said eccentrically mounted pins being adjustable radially to vary the throw imparted to said projector.

4. In a skill testing game, a projector for throwing onto a screen an image forming the target of the game, a universal mounting for said projector, and means for driving said projector to cause the target successively to traverse the screen, said means comprising a first link pivotally secured at one end, a second link pivotally secured at one end to the free end of said first link and at its other end pivotally secured to said projector, a longitudinal slot in each of said links, a motor, a first gear driven by said motor, a second gear driven by said first gear, and an eccentrically mounted pin rotatable with each of said gears and engaging in the slot in one of said links.

5. Projecting mechanism comprising, in combination, a projector for throwing an image onto a screen, a support including a universal mounting for said projector, and means for driving said projector to cause the image successively to traverse the screen, said means comprising a first link pivotally secured at one end to said support, a second link pivotally secured at one end to the free end of said first link and at its other end pivotally secured to said projector, a rotary means for each of said links engaging the same to cause pivotal movement thereof, and means for driving said rotary means at slightly varying speeds.

6. Protecting mechanism comprising, in combination, a projector for throwing an image onto a screen, a universal mounting for said projector, and means for driving said projector to cause the image successively to traverse the screen, said means comprising a first link pivotally secured at one end, a second link pivotally secured at one end to the free end of said first link and at its other end pivotally secured to said projector, a motor, a first gear driven by said motor, a second gear driven by said first gear, and an eccentrically mounted pin rotatable with each of said gears and engaging said links intermediate the ends thereof to cause pivoting thereof.

7. Projecting mechanism comprising, in combination, a projector for throwing an image onto a screen, a universal mounting for said projector, and mechanism for driving said projector comprising means for producing the component of the movement of the image in one direction, and means for producing the component of the movement of the image in the direction at right angles to the first direction, the component of movement of one means being transmitted through the other means and being merged with the component of movement of the other means prior to application of said projector.

8. Projecting mechanism comprising, in combination, a projector for throwing an image onto a screen, a universal mounting for said projector, and mechanism for driving said projector comprising a first means for producing the component of the movement of the image in one direction, and a second means for producing the component of the movement of the image in a direction at right angles to the first direction, said first means being connected to transmit its motion through said second means and only said second means having direct engagement with said projector.

9. Projecting mechanism comprising, in combination, a projector for throwing an image onto a screen, a universal mounting for said projector, and mechanism for driving said projector comprising means for producing the component of the movement of the image in one direction, and means for producing the component of the movement of the image in the direction at right angles to the first direction, one of said means including a pivotally mounted link, driving means variably engaging said link to swing the same about its pivot, and means operable continuously further to vary the point of engagement of said driving means with said link by moving one relative to the other.

10. Projecting mechanism comprising, in combination, a projector for throwing an image onto a screen, a universal mounting for said projector, and mechanism for driving said projector comprising means for producing the component of the movement of the image in one direction, and means for producing the component of the movement of the image in the direction at right angles to the first direction, only one of said means having direct engagement with said projector with the other of said means connected to transmit its motion through the one means, and means maintaining a predetermined, timed relationship between the operation of said first mentioned means other than synchronous operation.

11. Projecting mechanism comprising, in combination, a projector for throwing an image onto a screen, a universal mounting for said projector, and mechanism for driving said projector comprising a first means for producing the component of the movement of the image in one direction including a pivotally mounted link and means for actuating the same, and a second means for producing the component of the movement of the image in a direction at right angles to the first direction including a pivotally mounted link and means for actuating the same, said first means connected to transmit its motion through said second means and only said second means having direct engagement with said projector, the actuating means of said first and second means being drivingly interconnected to operate at slightly different rates.

12. Projecting mechanism comprising, in combination, a projector for throwing an image onto a screen, a universal mounting for said projector, and means for driving said projector to cause the image successively to traverse the screen in different paths, said means comprising a first link pivotally secured at one end, a second ling pivotally secured at one end to the free end of said first link and at its other end secured to said projector, a motor, a first gear driven by said motor, and a second gear driven by said first gear and having a different number of teeth than said first gear, each of said gears having rotatable therewith an eccentrically mounted means slidably engaging one of said links intermediate the ends thereof.

13. Projecting mechanism comprising, in combination, a projector for throwing an image onto a screen, a universal mounting for said projector, and means for driving said projector to cause the image successively to traverse the screen, with each traverse in the same direction being over an irregular path and the successive paths each differing from the preceding path, including series connected driving linkages, and actuating means for each of the linkages driving the same in variable timed relationship.

14. In a mechanism for generating movement of a target repeatedly over a given range, means for forming a moving target including a frame, a universal mounting for said frame, and means for driving said frame to cause the target successively to traverse a given range in different paths, said last mentioned means comprising a first link pivotally secured at one end, a second link pivotally secured at one end to the free end of said first link and at its other end secured to said frame, a longitudinal slot in each of said links, a motor, a first gear driven by said motor, and a second gear different from said first gear driven by said first gear, each of said gears having rotatable therewith an eccentrically mounted pin engaging in the slot in one of said links, at least one of said eccentrically mounted pins being adjustable radially to vary the throw imparted to said frame.

15. In a mechanism for generating movement of a target repeatedly over a given range, means for forming a moving target including a frame, a support including a universal mounting for said frame, and means for driving said frame to cause the target successively to traverse the given range in different paths, said means comprising a first link pivotally secured at one end to said support, a second link pivotally secured at one end to the free end of said first link and at its other end pivotally secured to said frame, a rotary means for each of said links engaging the same to cause pivotal movement thereof, and means for driving said rotary means at slightly varying speeds.

16. In a mechanism for generating movement of a target repeatedly over a given range, means for forming a moving target including a frame, a universal mounting for said frame, and mechanism for driving said frame comprising means for producing the component of the movement of the target in one direction, and means for producing the component of the movement of the target in the direction at right angles to the first direction, the component of movement of one means being transmitted through the other means and being merged with the component of movement of the other means prior to application to said frame.

17. In a mechanism for generating movement of a target over a given range, means for forming a moving target including a frame, a universal mounting for said frame, and means for driving said frame comprising a first means for producing the component of the movement of the target in one direction including a pivotally mounted link and means for actuating the same, and a second means for producing the component of the movement of the target in a direction at right angles to the first direction and including a pivotally mounted link, and means for actuating the same, said first means connected to transmit its motion through said second means and only said second means having direct engagement with said frame, the actuating means of said first and second means being drivingly interconnected to operate at slightly different rates.

18. In a mechanism for generating movement of a target repeatedly over a given range, means for forming a moving target including a frame, a universal mounting for said frame, and means for driving said frame to cause the target successively to traverse a given range in different paths, said last mentioned means comprising a first link pivotally secured at one end, a second link pivoted at one end to the free end of said first link and at its other end secured to said frame, a motor, a first gear driven by said motor, and a second gear driven by said first gear and having a different number of teeth than said first gear, each of said gears having rotatable therewith an eccentrically mounted means slidably engaging one of said links intermediate the ends thereof.

MELVIN J. BINKS.